United States Patent [19]

Usami

[11] Patent Number: 5,654,783
[45] Date of Patent: Aug. 5, 1997

[54] LCD DEVICE HAVING A PLURALITY OF SWITCHING ELEMENTS DIVIDED INTO PLURAL GROUPS, WHEREIN EACH PAIR OF GROUPS ARE ARRANGED IN A STEPPED CONFIGURATION

[75] Inventor: Yoshihisa Usami, Shizuoka-ken, Japan

[73] Assignee: Fuji Photo Film Co., Ltd., Kanagawa, Japan

[21] Appl. No.: 624,893

[22] Filed: Mar. 27, 1996

Related U.S. Application Data

[62] Division of Ser. No. 225,303, Apr. 8, 1994, Pat. No. 5,532,851.

[30] Foreign Application Priority Data

Apr. 9, 1993 [JP] Japan ................ 5-106014
Jul. 14, 1993 [JP] Japan ................ 5-174399

[51] Int. Cl.⁶ .................. G02F 1/1343; G02F 1/1333
[52] U.S. Cl. ................................ 349/143; 349/159
[58] Field of Search .......................... 349/143, 147, 349/139, 46, 95, 159

[56] References Cited

U.S. PATENT DOCUMENTS

| | | | |
|---|---|---|---|
| 3,736,047 | 5/1973 | Gelber et al. | 349/137 |
| 4,147,409 | 4/1979 | Apfel | 359/584 |
| 4,183,630 | 1/1980 | Funada et al. | 349/159 |
| 4,529,272 | 7/1985 | Kruger et al. | 349/137 |
| 4,632,514 | 12/1986 | Ogawa et al. | 349/107 |
| 5,035,490 | 7/1991 | Hubby, Jr. | 349/159 |
| 5,040,875 | 8/1991 | Noguchi | 349/107 |
| 5,150,235 | 9/1992 | Haim et al. | 349/107 |
| 5,153,754 | 10/1992 | Whetten | 349/147 |
| 5,187,604 | 2/1993 | Taniguchi et al. | 349/147 |
| 5,532,850 | 7/1996 | Someya et al. | 349/143 |

FOREIGN PATENT DOCUMENTS 4140714 5/1992 Japan.

OTHER PUBLICATIONS

"Thin–Film Optical Filters", H.A. MacLeod, Nikkan Industrial Press, Nov. 3, 1989, pp. 47–51.

*Primary Examiner*—Anita Pellman Gross
*Assistant Examiner*—Toan Ton
*Attorney, Agent, or Firm*—Sughrue, Mion, Zinn, Macpeak & Seas

[57] ABSTRACT

An optical switching element having a variable optical path length layer whose optical path length is varied and whose refractive index anisotropy is controlled by application of an external field; external field application device for applying the external field to the variable optical path length layer; a first non-varying optical path length layer formed at at least one surface of surfaces of the variable optical path length layer in a direction of thickness thereof, and having a refractive index which is greater than a maximum refractive index of the variable optical path length layer; and a second non-varying optical path length layer formed at at least one surface of the surfaces of the variable optical path length layer in the direction of thickness thereof, and having a refractive index which is less than a minimum refractive index of the variable optical path length layer. By controlling refractive index anisotropy of the variable optical path length layer, natural light can be modulated. Further, due to interference effects of the first and second non-varying optical path length layers, incident light can be controlled at a high contrast ratio especially in cases in which a specific wavelength is targeted. Accordingly, incident light can be used efficiently, and a good switching characteristic can be obtained.

3 Claims, 11 Drawing Sheets

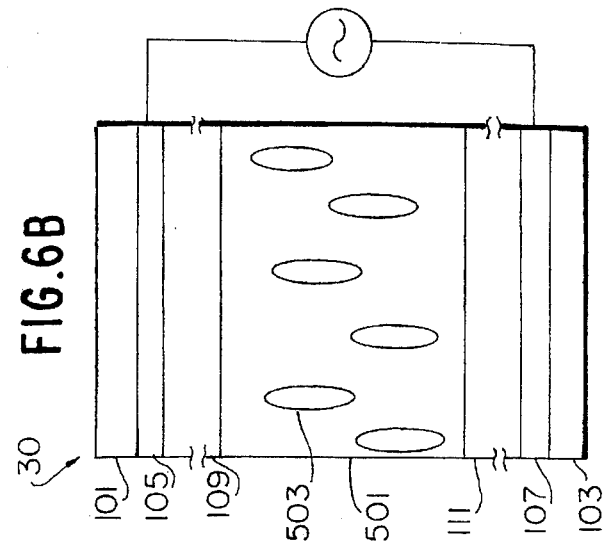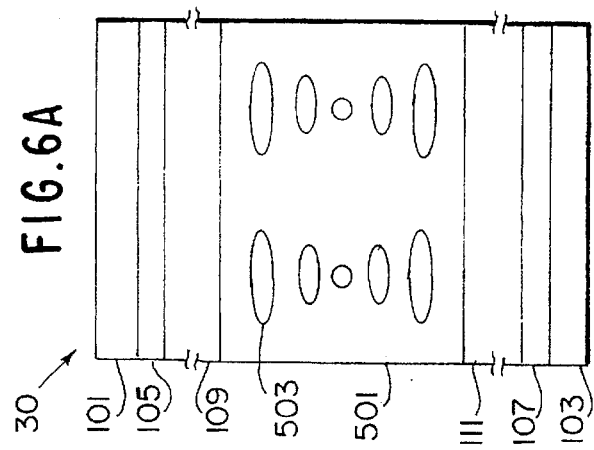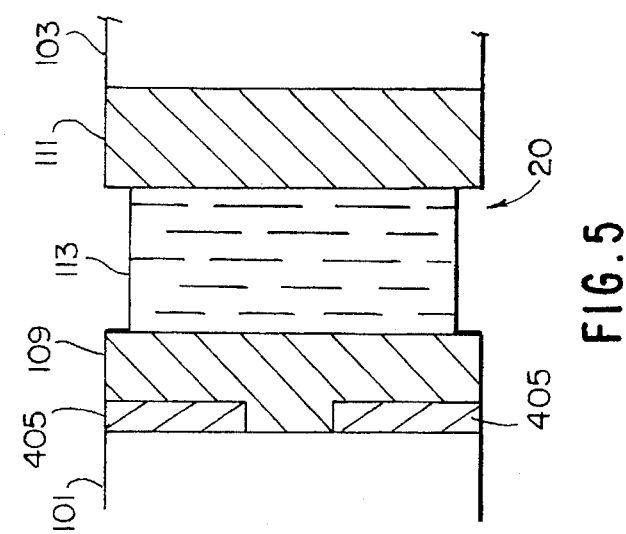

LCD DEVICE HAVING A PLURALITY OF SWITCHING ELEMENTS DIVIDED INTO PLURAL GROUPS, WHEREIN EACH PAIR OF GROUPS ARE ARRANGED IN A STEPPED CONFIGURATION

This is a divisional of application Ser. No. 08/225,303, filed Apr. 8, 1994 now U.S. Pat. No. 5,532,851.

BACKGROUND OF THE INVENTION

1. Field of the Invention

The present invention relates to an optical switching element in which light transmittance can be controlled by using interference of the light.

2. Description of the Related Art

In recent years, liquid crystal elements have been used a means for effecting light modulation. For example, when a torsional nematic liquid crystal element is used, a pair of polarizing plates must be provided. However, in a system equipped with polarizing plates, because there is a large loss in the amount of transmitted light at the polarizing plates, light modulation must be effected due to this loss.

As a means for effecting light modulation, there is an optical switching element which varies the transmittance of the liquid crystal so as to set the intensity of the transmitted light to two values of brightness. For example, there are structures utilizing a complex refraction effect which is obtained by controlling the complex refraction of the layer of nematic-type liquid crystal. Layers adjacent to the liquid crystal have different refractive indices, and the refractive index of the layer of liquid crystal can be varied by the application of an electric field.

When such an optical switching element is used, for example, in a display device, the amount of light of the light source must be increased in consideration of the amount of light which is lost. Further, because the capacity of the light source is thereby increased, the amount of electric power consumed increases. An increase in consumption of electric power is not desirable because, for example, when the element is used in a portable computer, the operation time is shortened.

Moreover, when such an optical switching element is used as a shutter for exposure, either the amount of light of the light source must be increased or the exposure time must be lengthened to compensate for the amount of light which is lost. In particular, addressing this drawback by lengthening the exposure time may result in a loss of throughput at a printer or the like.

Further, in recent years, attempts have been made to use the above-described switching element in a display device to display highly detailed images on the display device. For example, when a television image is displayed, the number of scan lines necessary for one screen is 400 or more. However, in a matrix-type liquid crystal panel, the number of scan electrodes which can be disposed within the panel is limited to around 100. In order to address this matter, the signal electrodes are divided and the number of scan electrodes forming one screen is increased equivalently, and the plurality of scan electrodes which are connected commonly are scanned simultaneously.

As described above, in an optical system using polarizing plates, it is difficult to avoid the drawback of loss of the amount of light at the polarizing plates and to modulate light efficiently. Further, in structures utilizing the interference effect of a nematic liquid crystal, in order to achieve the desired interference effect, it is necessary to consider the refractive indices of a plurality of layers and it is difficult to design a structure in which the desired interference effect is obtained only at a target wavelength.

On the other hand, an example of a switching means using a nematic-type liquid crystal and effectively utilizing light is disclosed in Japanese Patent Application Laid-Open No. 4-140714. In this means, light incident on a complex refractive prism is separated into P polarized light and S polarized light. The S polarized light is deflected into P polarized light at a halfwave plate. The two sets of P polarized light are made incident on the nematic-type liquid crystal. In accordance with the above-described means, the efficiency with which light is used can be increased by using the polarized light of two directions. However, the loss of light at the polarization conversion system and the complexity of the structure provided with the polarization conversion system cannot be avoided.

Further, when highly detailed images are displayed, the signal electrodes within the panel are divided. As a result, it is necessary to lead a signal wire out from each of the divided signal electrodes. Because the signal wires are lead out from upper and lower portions of the signal electrodes, it is necessary to divide this divided structure into an upper structure and a lower structure. Further, the number of scan electrodes which are multiplex-driven in a simple matrix panel depends on the responsiveness of the liquid crystal. As a result, the number of scan electrodes is limited, and it is difficult to display a highly detailed image.

SUMMARY OF THE INVENTION

In view of the aforementioned, an object of the present invention is to provide an optical switching element in which light incident on the optical switching element can be utilized effectively and light exiting from the optical switching element has a high contrast ratio, and which has an electrode structure which permits display of highly detailed images.

The first aspect of the present invention is an optical switching element having: a variable optical path length layer whose optical path length is varied and whose refractive index anisotropy is controlled by application of an external field; external field application means for applying the external field to the variable optical path length layer; at least one layer of a material having a first non-varying optical path length and having a refractive index which is greater than a maximum refractive index of the variable optical path length layer; and at least one layer of a material having a second non-varying optical path length, and having a refractive index which is less than a minimum refractive index of the variable optical path length layer; wherein a layered body is formed by the variable optical path length layer, the external field application means, the first non-varying optical path length layer and the second non-varying optical path length layer, the layered body varying the optical path length of the variable optical path length layer and controlling interference of light transmitted through the layered body so that the transmitted light becomes a predetermined intensity.

The second aspect of the present invention is an optical switching element having: a variable optical path length layer whose optical path length is varied and whose refractive index anisotropy is controlled by application of an external field; external field application means for applying the external field to the variable optical path length layer; at least one layer of a material having a first non-varying optical path length; and at least one layer of a material having a second non-varying optical path length layer; wherein the first non-varying optical path length layer and the second non-varying optical path length layer are formed such that a difference between a refractive index of the first non-varying optical path length layer and a refractive index of the second non-varying optical path length layer is greater than or equal to 0.2, and a layered body is formed by the variable optical path length layer, the external field application means, the first non-varying optical path length layer and the second non-varying optical path length layer, the layered body varying the optical path length of the variable optical path length layer and controlling interference of light transmitted through the layered body so that the transmitted light becomes a predetermined intensity.

In the third aspect of the present invention, in at least one of the first aspect and the second aspect of the present invention, the variable optical path length layer is a twist liquid crystal.

In the fourth aspect of the present invention, in at least one of the first aspect and the second aspect of the present invention, the variable optical path length layer has a scattering effect.

The fifth aspect of the present invention is an optical switching element having: a plurality of switching elements having a matrix arrangement electrode structure in which signal electrodes are divided and scan electrodes are driven simultaneously, adjacent switching elements being provided such that respective surfaces of the plurality of switching elements, among surfaces thereof running substantially along an optical path direction, are set in a stepped configuration; and a parallax eliminating member provided between the electrode structure and the respective surfaces of the plurality of switching elements, among the surfaces thereof running substantially along the optical path direction, the parallax eliminating member being disposed in a same plane as display surfaces of the plurality of switching elements.

In accordance with the first and second aspects of the present invention, due to the aforementioned structure, light incident on the layered body is interfered, and the intensity of the light becomes higher or lower. The interference characteristic of the light passing through the layered body depends on the optical path length of each layer. Accordingly, by varying the optical path length of the variable optical path length layer so as to vary the optical path length of the layered body, interference light can be controlled. Because the variable optical path length layer can modulate natural light, the refractive index anisotropy thereof can be controlled, and the average refractive index anisotropy can be set to about 0.

The interference characteristic of the transmitted light is different for each wavelength, and a good brightness contrast ratio is obtained in a predetermined wavelength region. Accordingly, in a specific wavelength region, by setting the optical path length of each layer so as to obtain a good brightness contrast ratio, a good switching characteristic is obtained. Further, by controlling the interference light, light of an intermediate intensity other than the two brightness values is obtained.

The variable optical path length layer is a layer whose optical path length varies in accordance with application of an external field such as an electric field, a magnetic field, a sound field, or the like.

In the wavelength which is being considered (hereinafter, "the target wavelength"), the range of the optical path length of the layered body for obtaining the desired interference effect is calculated on the basis of commonly-known methods (see "Optical Thin Films" by H. A. Macleod, pp. 47 through 51, 1989). On the basis of the results of calculation, the optical path length of each layer is set in order to obtain a good interference effect. The layered body is, for example, interposed between glass substrates. However, on the premise of the calculations, the reflection of the incident light which occurs at the surfaces of the substrates can be ignored.

In accordance with the third aspect of the present invention, a twist liquid crystal is used as the variable optical path length layer. In the liquid crystal, liquid crystal molecules are torsionally oriented continuously from one side of the layer to the other side. The refractive index anisotropy can be controlled by the torsional orientation. Although there exist various settings for the range of the torsional angle, in order to obtain a high contrast ratio it is preferable that the torsional angle is an integer multiple of 180 degrees. The direction of the torsion may either be to the left or to the right.

In accordance with the fourth aspect of the present invention, a light modulating means having a scattering effect is used as the variable optical path length layer. Examples of the light modulating means are a light scattering liquid crystal compounded body or a dynamic-scattering-type liquid crystal. In the light scattering liquid crystal compounded body, granular liquid crystals may be scattered in the polymer, or granular liquid crystals may be continuous in the polymer, or a polymer net may be formed in the liquid crystal.

In accordance with the fifth aspect of the present invention, in the optical switching element which is arranged in a matrix and in which the signal electrodes are divided, the divided optical switching elements are arranged in a stepped configuration. Further, in order to align the display surfaces of the respective optical switching elements in the same plane, a parallax eliminating member is interposed between the matrix electrodes of a predetermined optical switching element and the glass substrate.

When the display surfaces of the optical switching elements are set in a stepped configuration, parallax in a rearward direction arises in a portion of the displayed image. The continuity of the image thereby deteriorates. Accordingly, in order to bring the image of this region up into the same plane as that of the other displayed images, the parallax eliminating member is used. Accordingly, the displayed image is continuous.

Further, because the divided optical switching elements are arranged in a stepped configuration, signal wires are lead out without interfering with each other even if signal wires are lead out from each of the optical switching elements.

In accordance with the above-described invention, by controlling the refractive index anisotropy of the variable optical path length layer, natural light can be modulated. Due to the interference effect of the layered interference layers, the incident light can be controlled at a high contrast ratio especially when a specific wavelength is targeted. Accordingly, incident light can be used efficiently, and a good switching characteristic can be obtained. Further, because there is no need for polarizing plates, deterioration of the durability of the element due to the provision of the polarizing plates can be avoided.

A structure for obtaining a desired interference effect in a target wavelength is easily set by taking into consideration the optical path length of the single variable optical path length layer and the optical path lengths of the non-varying optical path length layers which exhibit an enhancement effect.

Moreover, in order to easily lead the signal wires out, the optical switching elements can be divided in a stepped configuration, and parallax in the display surfaces which arises due to the stepped configuration can be compensated for by a fiber array. Accordingly, the optical switching elements can be divided into a plurality of steps in accordance with the resolution of the image. Further, because parallax can be compensated for by using the fiber array, highly precise images can be displayed.

BRIEF DESCRIPTION OF THE DRAWINGS

FIG. 5 is a schematic structural view illustrating another embodiment of electrodes used in the optical switching element illustrated in FIG. 1.

FIG. 6A is a schematic structural view of an optical switching element using a torsional nematic liquid crystal when no electric field is applied.

FIG. 6B is a schematic structural view of an optical switching element using a torsional nematic liquid crystal when an electric field is applied.

FIG. 6B is varied.

FIG. 6B is varied.

FIG. 6B is varied.

FIG. 6B is varied.

FIG. 6B is varied.

FIG. 6B is varied.

FIG. 6B is varied.

DESCRIPTION OF THE PREFERRED EMBODIMENT

Figure 1:
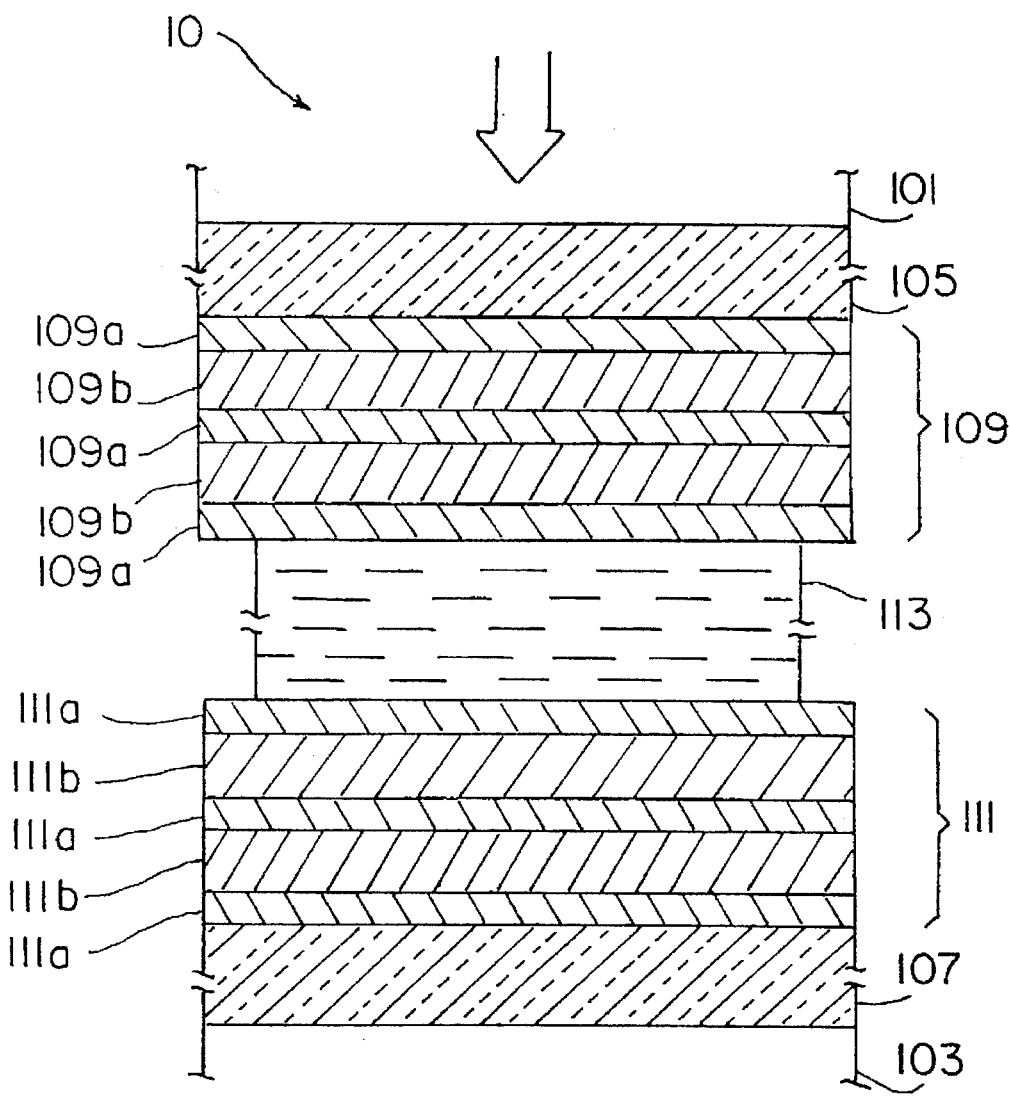
FIG. 1 is a structural view illustrating an embodiment of an optical switching element relating to the present invention.

An embodiment of the present invention will be described hereinafter with reference to the drawings. FIG. 1 illustrates an embodiment of an optical switching element 10 relating to the present invention.

As illustrated in FIG. 1, in the optical switching element 10, ITO (indium tin oxide) transparent electrodes 105, 107, which are disposed in a necessary pattern, and interference layers 109, 111 are symmetrically disposed so as to oppose each other on glass substrates 101, 103, respectively. Further, a liquid crystal layer 113 which is oriented parallel to the glass substrates 101, 103 is interposed between the interference layer 109 and the interference layer 111.

The oriented state of the liquid crystal layer 113 is obtained by orientation processing of the respective surfaces of the interference layers 109, 111 at the liquid crystal side, e.g., by rubbing processing, rubbing processing after the orientation film has been applied, processing by silane coupling agents as surface processing or a combination of these processes. The liquid crystal layer 113 is formed by spacers of uniform thicknesses being disposed in a predetermined pattern and liquid crystal being injected into the resulting gaps.

Hereinafter, the optical path length of each layer forming the optical switching element 10 will be described. The optical path length of each layer depends upon the target wavelength λ. In the present embodiment, the target wavelength is 427 nm.

The refractive index ns and the layer thickness ds of each of the glass substrates 101, 103 are set to 1.5 and 1 nm, respectively. The refractive index nc and the layer thickness dc of each of the transparent electrodes 108, 107 are set to 1.5 and 300 nm, respectively.

A good contrast ratio is obtained if either the optical path length of the liquid crystal layer 113 when an electric field is applied or the optical path length of the liquid crystal layer 113 when no electric field is applied is n/8 (wherein n is a positive integer) of the target wavelength 427 nm. Hereinafter, the optical path length of the liquid crystal layer 113 is not limited in particular, and may be either the optical path length when an electric field is applied or the optical path length when no electric field is applied. The appropriate layer thickness of the liquid crystal layer 113 depends on the optical conditions of the interference layers 109, 111, and is selected under the condition of n/8 times the target wavelength.

In the present embodiment, the refractive index nh when no electric field is applied and the refractive index nv when an electric field is applied are respectively 1.7242 and 1.5212. The layer thickness dl is 526 nm, and the dielectric anisotropy Δε is set to 15.8. The nematic-type liquid crystal ZLI-3928 (manufactured by Melk Inc.) can be used as a liquid crystal meeting the above specifications.

It is preferable that the refractive index anisotropy Δn (=ne−no) of a unit molecule of the liquid crystal layer 113 is greater than or equal to 0.1, and it is more preferable that the refractive index anisotropy is greater than or equal to 0.2.

First interference layers 109a, 111a formed of titanium oxide and second interference layers 109b, 111b formed of calcium fluoride are arranged alternately in five layers in the interference layers 109, 111, respectively. Each of the interference layers is formed with the layer thickness being controlled by vacuum layer formation, such as resistance heating deposition, electron beam deposition, sputtering, ion beam sputtering or the like, or by a spincoat method, a barcoat method, a spray method, or the like.

In the layered body formed by the glass substrates 101, 103, the interference layers 109, 111, and the liquid crystal layer 113, the optical path length for obtaining the interference characteristics of the interference layers 109, 111 is obtained by commonly-known methods. In the conditions relating to the present embodiment, the refractive index n1 of the interference layers 109a, 111a may be n1=2.2 to 2.7, which is greater than the refractive index nh (=1.7242) of the liquid crystal layer 113 when no electric field is applied. Further, the refractive index n2 of the interference layers 109b, 111b may be n2=1.23 to 1.26, which is smaller than the refractive index nv (=1.5212) of the liquid crystal layer 113 when an electric field is applied.

Other than titanium oxide, the interference layers 109a, 111a may be formed of hafnium dioxide (refractive index 2.0 to 2.1), tantalum pentoxide (refractive index 2.1 to 2.2), titanium dioxide (refractive index 2.2 to 2.7), zirconium dioxide (refractive index 2.0 to 2.1), or the like. Other than calcium fluoride, the interference layers 109b, 111b may be formed of silicon oxide (refractive index 1.4 to 2.0), aluminum oxide (refractive index 1.5 to 1.7), magnesium fluoride (refractive index 1.3 to 1.4), or the like. The refractive index of each material depends on the method by which the film is formed, the conditions under which the film is formed, and the target wavelength.

The refractive indices of the interference layers 109, 111 formed of titanium oxide and calcium fluoride in order to obtain the interference effect can be set in the above-described ranges. However, hereinafter, the present embodiment will be described by using a case in which n1 is set to 2.5 and n2 is set to 1.25. Further, in order to achieve the desired interference effect at the target wavelength of 427 nm, in addition to setting the refractive indices as described above, the layer thickness d1 of the interference layers 109a, 111a is set to 40 nm, and the layer thickness d2 of the interference layers 109b, 111b is set to 80 nm.

It is preferable that the layer thickness of the interference layers 109,111 is less than or equal to ±30% of n/4 (wherein n is a positive integer) of the target wavelength 427 nm, and less than or equal to ±10% is more preferable.

By setting the optical system of the layered body on the basis of well-known methods as described above, an ideal transmittance characteristic can be obtained.

Figure 2A:
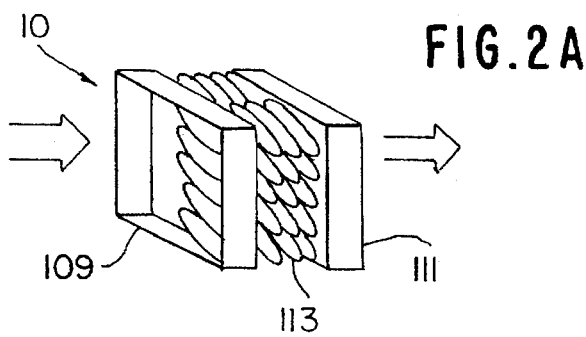
FIG. 2A is a view illustrating a state of a liquid crystal layer of the optical switching element illustrated in FIG. 1 when no electric field is applied.
Figure 2B:
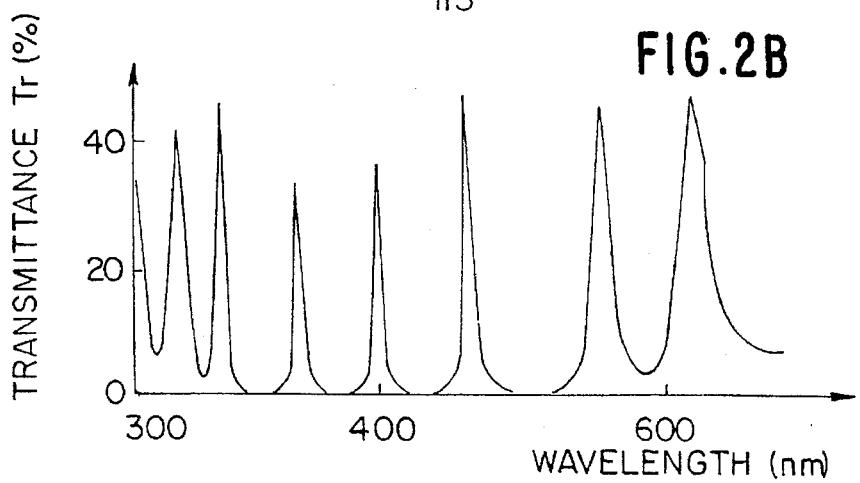
FIG. 2B is a characteristic view illustrating transmittance of the optical switching element illustrated in FIG. 1 when no electric field is applied.
Figure 2C:
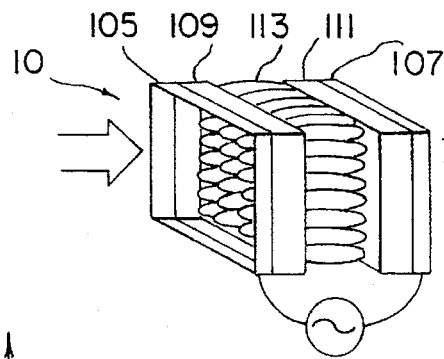
FIG. 2C is a view illustrating a state of the liquid crystal layer of the optical switching element illustrated in FIG. 1 when an electric field is applied.
Figure 2D:
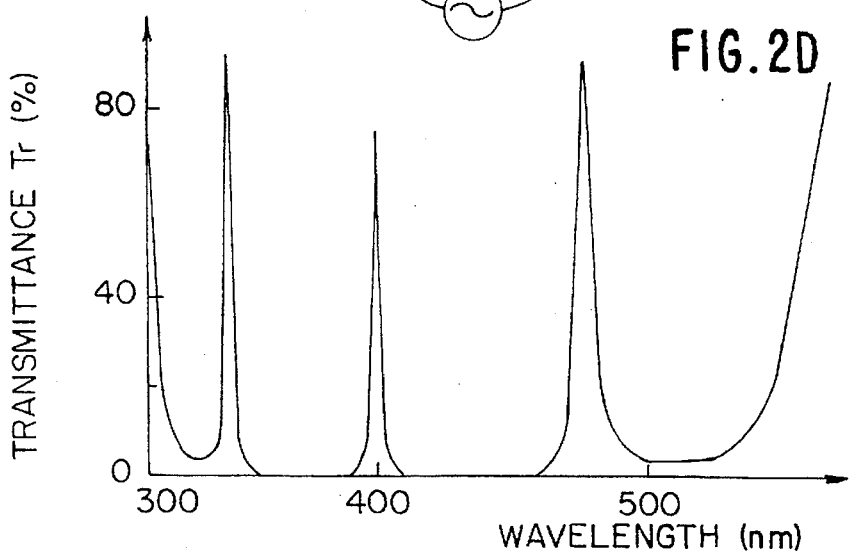
FIG. 2D is a characteristic view illustrating transmittance of the optical switching element illustrated in FIG. 1 when an electric field is applied.

A description will now be given, with reference to FIGS. 2A through 2D, of transmittance characteristics of the optical switching element 10 illustrated in FIG. 1. FIG. 2B and FIG. 2D illustrate ideal transmittance characteristics when no electric field is applied and when an electric field is applied, respectively. The vertical axis and the horizontal axis illustrate transmittance and wavelength, respectively.

As illustrated in FIGS. 2A through 2D, the transmittance of the optical switching element 10 depends on the optical path length of the liquid crystal layer 113 whose molecular orientation is varied by control of the magnetic field. In a vicinity of the target wavelength 427 nm, transmittances of about 50% and about 0% are obtained when no electric field is applied and when an electric field is applied, respectively. Accordingly, in a vicinity of a wavelength of 427 nm, a switching characteristic of a good contrast ratio can be obtained.

The optical conditions of each layer will now be described. First, with regard to the optical conditions of the liquid crystal layer, in the conditions of the embodiment illustrated in FIG. 1, when the optical path length of the liquid crystal layer 113 is set to ⅛ of the target wavelength λ, a small contrast ratio is obtained. When the optical path length is set to ¼ of the target wavelength λ, in general, a contrast ratio of 10:1 is obtained. Further, when the optical path length is set to ½ of the target wavelength λ, in general, a contrast ratio of at least 50:1 is obtained. Accordingly, allowing for a slight margin, when the optical path length is set to greater than or equal to ⅙ of the target wavelength λ, a switching characteristic of a good contrast ratio is obtained. Further, when the optical path length is set to greater than or equal to ⅓ of the target wavelength λ, a switching characteristic of an even better contrast ratio is obtained.

When the optical path length is set to 16 λ, the half-width at a target wavelength of 400 nm is about 11 nm. When the optical path length is set to 32 λ, the half-width is about 5 nm, and when the optical path length is set to 64 λ, the half-width is about 2 nm. As the optical path becomes longer, the steepness becomes greater. Accordingly, when the optical path length is set to less than or equal to 16 λ, a switching characteristic having the appropriate steepness is obtained.

Due to the contrast ratio and the steepness characteristic, when the target wavelength becomes λ, it is preferable that the range of the optical path which can be set for the liquid crystal layer 113 is from greater than or equal to λ/8 to less than or equal to 64 λ, and it is more preferable that the range is from greater than or equal to λ/6 to less than or equal to 32 λ, and it is most preferable that the range is from greater than or equal to λ/3 to less than or equal to 16 λ.

With regard to the optical conditions of the interference layer, the contrast ratio of the optical switching element 10 depends on the refractive index n1 of the interference layer 109a (and 111a) and the refractive index n2 of the interference layer 109b (and 111b).

FIGS. 3A through 3D illustrate transmittance characteristics when the difference between the above-mentioned refractive indices is set to 0.15, 0.23, 0.43 and 0.63, respectively. Here, the vertical axis and the horizontal axis represent transmittance and wavelength, respectively. The solid line represents transmittance when no electric field is applied, and the dotted line represents transmittance when an electric field is applied.

As illustrated, when the differences between the refractive indices are set to 0.15, 0.23, 0.43, and 0.63, the contrast ratios at the target wavelength are, in general, 1.4:1, 2:1, 10:1, and 50:1 (the ranges indicated by the arrows). As the difference between the refractive indices increases, a better contrast ratio is obtained. Accordingly, in order to obtain a satisfactory switching effect, the difference between the refractive indices should be from greater than or equal to 0.2 to less than or equal to 100, preferably greater than or equal to 0.4, and more preferably greater than or equal to 0.6.

The optical conditions of the elements having the characteristics illustrated in FIGS. 3A through 3D are as follows.

Figure 3A:
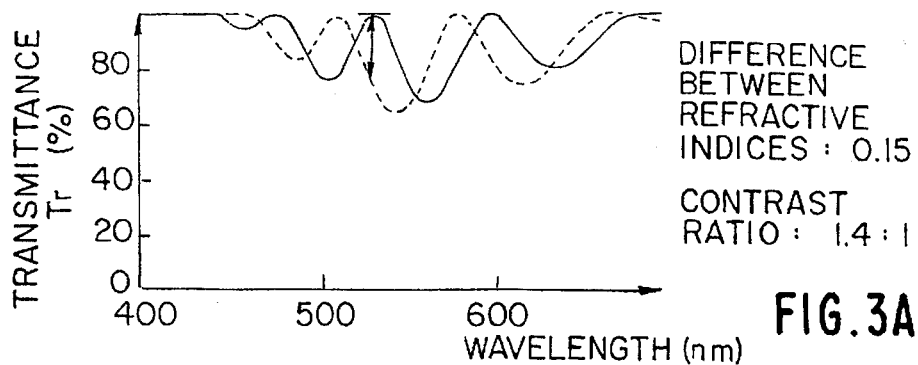
FIG. 3A is a characteristic view illustrating transmittance when a difference between refractive indices of interference layers of the optical switching element illustrated in FIG. 1 is varied.

In the element exhibiting the characteristics of FIG. 3A, the refractive index of the interference layer 109a (and 111a) is 1.61 and the layer thickness is 86 nm. The refractive index of the interference layer 109b (and 111b) is 1.46, and the layer thickness is 95 nm.

Figure 3B:
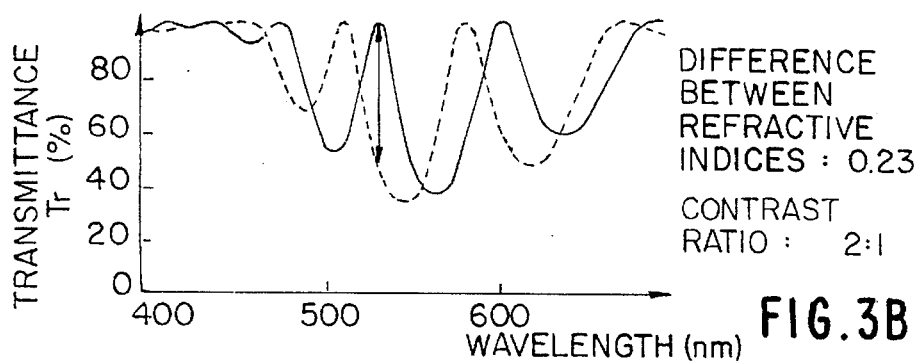
FIG. 3B is a characteristic view illustrating transmittance when the difference between refractive indices of interference layers of the optical switching element illustrated in FIG. 1 is varied.

In the element exhibiting the characteristics of FIG. 3B, the refractive index of the interference layer 109a (and 111a) is 1.7, and the layer thickness is 83 nm. The refractive index of the interference layer 109b (and 111b) is 1.46, and the layer thickness is 95 nm.

Figure 3C:
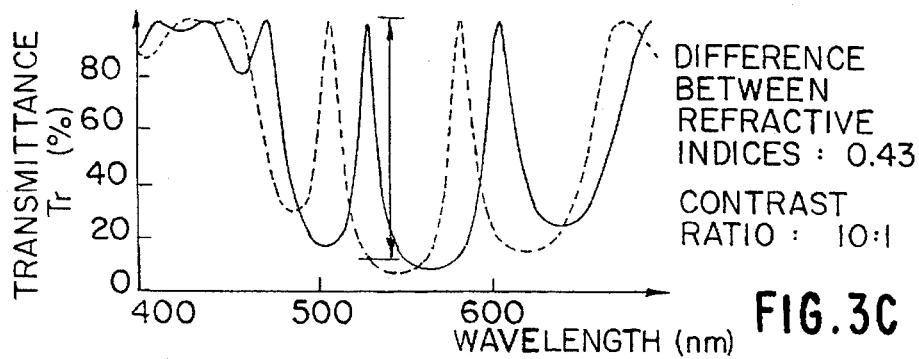
FIG. 3C is a characteristic view illustrating transmittance when the difference between refractive indices of interference layers of the optical switching element illustrated in FIG. 1 is varied.

In the element exhibiting the characteristics of FIG. 3C, the refractive index of the interference layer 109a (and 111a) is 1.9, and the layer thickness is 73 nm. The refractive index of the interference layer 109b (and 111b) is 1.46, and the layer thickness is 95 nm.

Figure 3D:
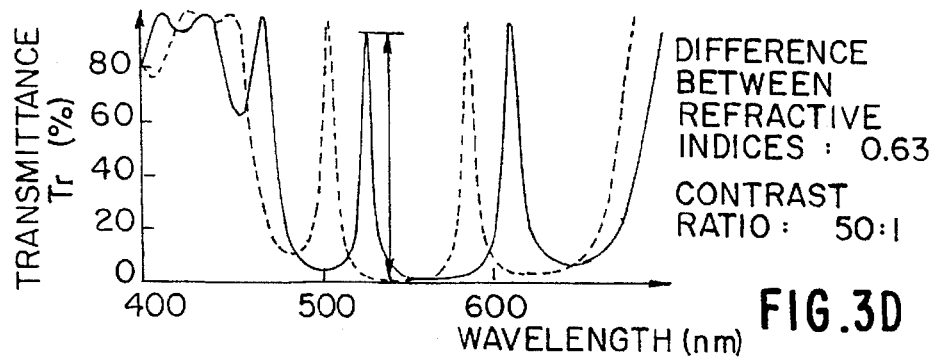
FIG. 3D is a characteristic view illustrating transmittance when the difference between refractive indices of interference layers of the optical switching element illustrated in FIG. 1 is varied.

In the element exhibiting the characteristics of FIG. 3D, the refractive index of the interference layer 109a (and 111a) is 2.1, and the layer thickness is 66 nm. The refractive index of the interference layer 109b (and 111b) is 1.48, and the layer thickness is 95 nm.

The refractive indices of the glass substrates 101, 105 are all set to 1.52. Each of the above-described characteristics can be obtained by switching a liquid crystal layer 113 which serves as a variable optical path length layer and which has refractive indices of 1.5 and 1.6.

In the conditions of the embodiment illustrated in FIG. 1, when two interference layers are formed, such as the interference layers 109a, 111a provided at the sides of the liquid crystal layer 113 respectively, a small contrast ratio is obtained. When six interference layers are formed, e.g., the interference layers 109a, 109b, 109a and the interference layers 111a, 111b, and 111a provided at the sides of the liquid crystal layer 113 respectively, in general, a contrast ratio of 10:1 is obtained. Further, when the ten interference layers illustrated in FIG. 1 are formed, in general, a contrast ratio of greater than or equal to 50:1 is obtained.

Accordingly, when the number of interference layers is set to ten or more, a switching characteristic having a good contrast ratio is obtained.

It suffices that at least one interference layer is formed on the liquid crystal layer 113. However, due to the above-described contrast characteristics, the number of layers of the interference layers 109, 111 should preferably be two or more, more preferably six or more, and most preferably ten or more.

The interference characteristic of the transmitted light of the optical switching element 10 depends on the order of the respective layers, the number of layers, and the optical path length of each layer. With respect to the order of the respective layers, the layers are generally combined such that adjacent layers have different refractive indices.

The optical switching element 10 described above exhibits a good switching characteristic at a specific wavelength. Accordingly, by using a filter which extracts only light of the specific wavelength, the effects of light other than light of the specific wavelength can be avoided.

Figure 4D:
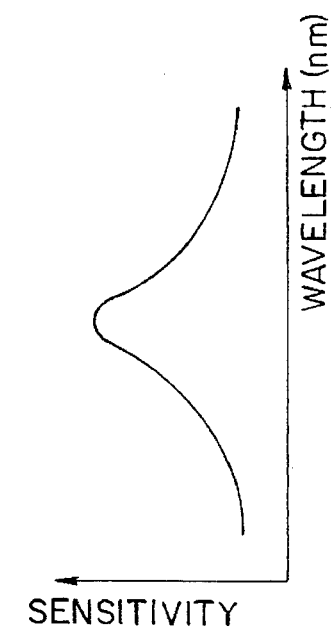
FIG. 4D is a spectral sensitivity characteristic view of a photosensitive material.
Figure 4E:
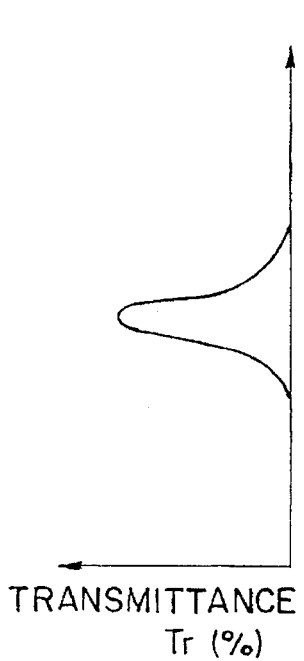
FIG. 4E is a characteristic view illustrating transmittance when no electric field is applied in a case in which the filter illustrated in FIG. 4A and the optical switching element illustrated in FIG. 1 are combined.
Figure 4F:
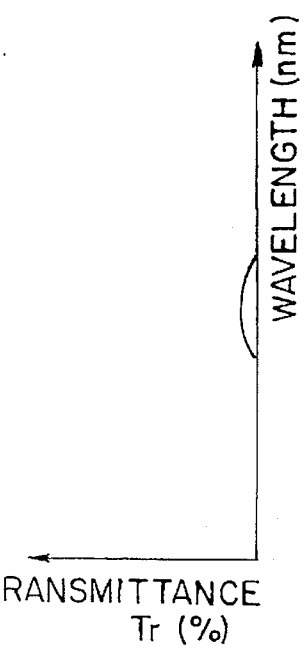
FIG. 4F is a characteristic view illustrating transmittance when an electric field is applied in a case in which the filter illustrated in FIG. 4A and the optical switching element illustrated in FIG. 1 are combined.
Figure 4A:
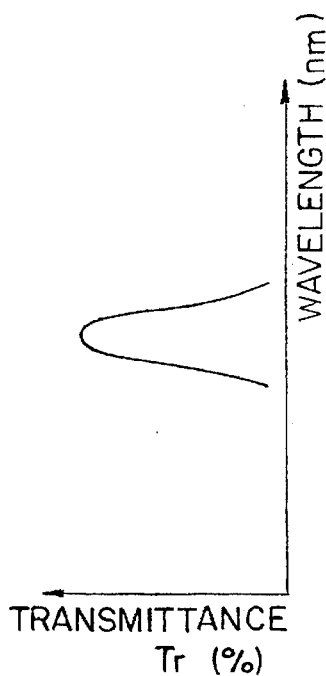
FIG. 4A is a characteristic view illustrating transmittance of a filter which is used in the optical switching element illustrated in FIG. 1 and through which only light of a specific wavelength passes.
Figure 4B:
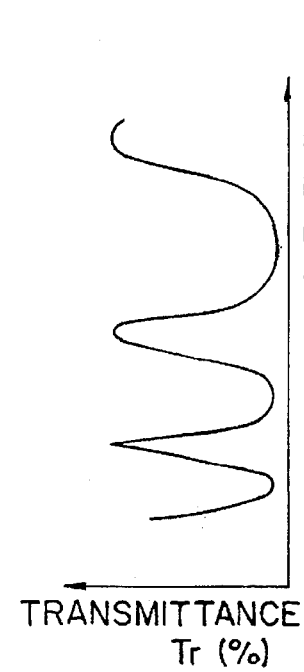
FIG. 4B is a characteristic view illustrating transmittance of the optical switching element illustrated in FIG. 1 when no electric field is applied.
Figure 4C:
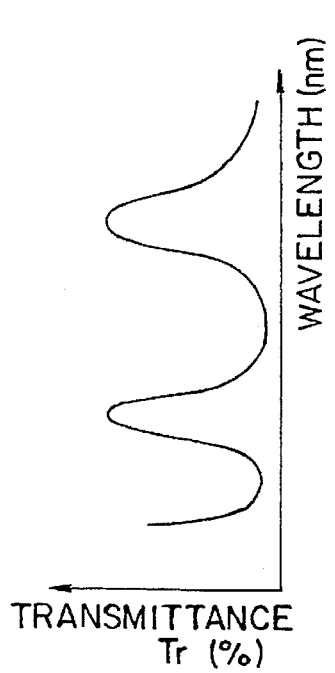
FIG. 4C is a characteristic view illustrating transmittance of the optical switching element illustrated in FIG. 1 when an electric field is applied.
Figure 7A:
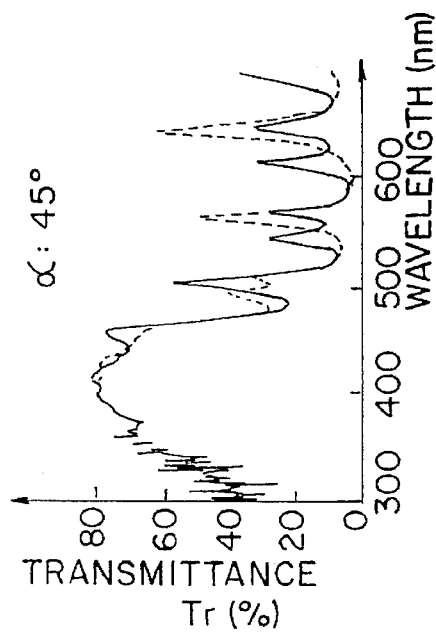
FIG. 7A is a characteristic view illustrating transmittance in a case in which a torsional angle of the optical switching element illustrated in FIG. 6A
Figure 7B:
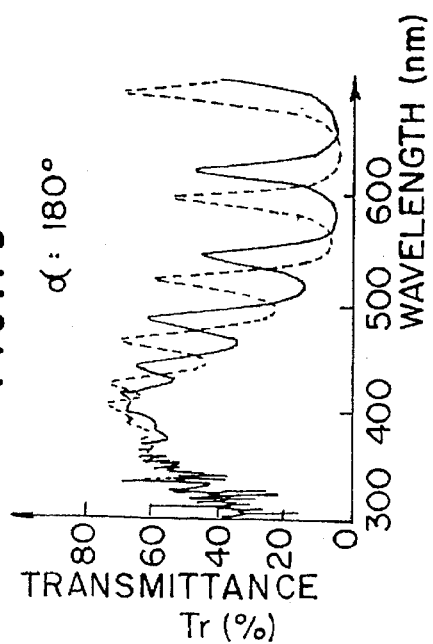
FIG. 7B is a characteristic view illustrating transmittance in a case in which a torsional angle of the optical switching element illustrated in FIG. 6A
Figure 7C:
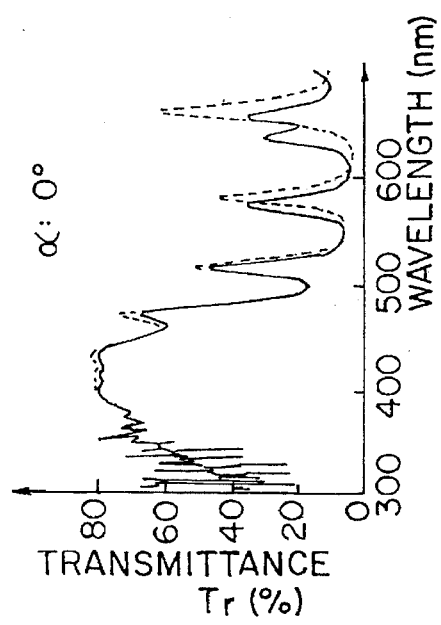
FIG. 7C is a characteristic view illustrating transmittance in a case in which a torsional angle of the optical switching element illustrated in FIG. 6A
Figure 7D:
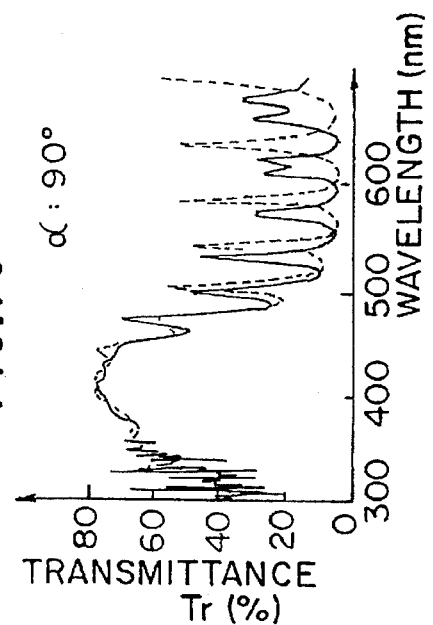
FIG. 7D is a characteristic view illustrating transmittance in a case in which a torsional angle of the optical switching element illustrated in FIG. 6A

Hereinafter, effects in a case in which a filter is used will be described with reference to FIGS. 4A through 4F. FIG. 4A illustrates a transmittance characteristic of a filter. FIGS. 4B and 4C respectively illustrate a transmittance characteristic of the optical switching element 10. FIG. 4D illustrates a spectral sensitivity of a photosensitive material. FIGS. 4E and 4F respectively illustrate a transmittance characteristic when the filter illustrated in FIG. 4A is combined with the optical switching elements 10 illustrated in FIGS. 4B and 4C, respectively.

When, for example, transmitted light of the optical switching elements 10 having the transmittance characteristics illustrated in FIGS. 4B and 4C is illuminated to a photosensitive material having the spectral characteristic illustrated in FIG. 4D, light having a uniform wavelength is illuminated to the photosensitive material, and an image which lacks contrast is exposed.

On the other hand, as illustrated in FIGS. 4E and 4F only a light of a specific wavelength region is transmitted when the filter having the transmittance characteristic illustrated in FIG. 4A is combined with the optical switching element 10 is extracted. Accordingly, when the light of the specific wavelength region is illuminated onto the photosensitive material having the characteristic illustrated in FIG. 4D, an image having excellent contrast is exposed.

In the liquid crystal layer 113 forming the optical switching element 10, an electric field is applied to the glass substrates 101, 103 by the respective transparent electrodes 105, 107 opposed thereto. However, for example, as illustrated in FIG. 5, an electric field may be applied to the liquid crystal layer 113 by electrodes 405 which are provided at either one of the glass substrates 101, 103, and which are separated by a necessary gap, and which are disposed in a necessary pattern.

In a light switching device 20 which is structured as described above, the arrangement of the liquid crystal molecules corresponding to the gap between the electrodes 405 is changed, and the transmittance characteristic of the light passing through this gap is controlled.

Accordingly, because regions other than this gap can be shaded, there is no need to provide transparent electrodes.

Transparent electrodes have a drawback in regard to durability with respect to ultraviolet rays. Therefore, by eliminating the need for transparent electrodes, the durability of the element can be improved. Further, because the surface resistance of the pattern-arranged electrode is low, there is no dulling of the signal waveform during application of the electric field. Accordingly, rapid response of the switching element is possible.

In the above embodiment, a case is described in which an ideal switching characteristic is obtained by using a nematic-type liquid crystal layer as the variable optical path length layer, and the optical path length is varied by the electrooptic effect caused by the application of an electric field.

Hereinafter, explanation will be given of a case in which another modulating means is applied to the variable optical path length layer. In the optical switching elements described hereinafter, the interference layers 109a, 111a are formed of silicon dioxide and have a layer thickness of 85 nm, and the interference layers 109b, 111b are formed of titanium dioxide and have a layer thickness of 54 nm.

In FIGS. 6A and 6B, an optical switching element 30 using a torsional nematic liquid crystal is illustrated. As illustrated in FIG. 6A, a torsional nematic liquid crystal 501 is interposed between layered bodies formed by the glass substrates 101, 103, the electrodes 105, 107 and the interference layers 109, 111. In the torsional nematic liquid crystal 501, the major axes of the liquid crystal molecules are arranged torsionally at predetermined angles α continuously between the layers.

The conditions for forming the torsional nematic liquid crystal 501 are described below.

Substrate Formation

Ultrasonically clean glass substrate (thickness 1.1 mm) in alcohol (about 10 minutes). Thereafter, clean in pure water and dry.

Electrode Formation

Film formation of ITO by sputtering (thickness about 200 nm, area resistance about 10 Ω/□).

Oriented Layer Formation

Apply (hardening temperature 295° C., 60 minutes) a solution in which, with respect to a mixed solvent in which N-methyl-2-pyrrolidone, 2-(2-ethoxy)ethanol and 2-n-butoxyethanol are mixed at a mixing ratio of 1:2:2, LQ1800 (a polyimide varnish manufactured by Hitachi Chemical, Ltd.) is dissolved at a mixing ratio of 1:0.2.

Rubbing Treatment

Rotational rubbing by a raised nylon cloth (500 rpm×30 seconds and 2500 rpm×25 seconds and 500 rpm×10 seconds). The rubbing direction is set in accordance with the torsional angles between the layers of the liquid crystal molecules.

Assembly

Adhere together by adhesive SE4500 (manufactured by Haven Co.) via 10 μm diameter "Shinshi-balls" (trade name of SiO$_2$ beads manufactured by Shokubai Chemical, Ltd.). (Method of hardening is pressure/heat hardening by a vacuum pack at 60° C. for 30 minutes and at 130° C. for 30 minutes.)

Liquid Crystal Injection

Inject, at normal temperatures, liquid crystal E8 (manufactured by Melk Co.) to which a chiral agent CB15 (manufactured by Melk Co.) is added in a necessary amount so that the helical pitch is suited to the torsional angle (a helical pitch of 1.3 μm is obtained by a 10% addition of the chiral agent).

When no electric field is applied to the torsional nematic liquid crystal 501 forming the optical switching element 30, liquid crystal molecules 503 are torsionally arranged at predetermined angles α. Natural light which is incident has polarized light of a plurality of directions. In this state, the incident light interferes in the interior of the switching element, and the peak wavelength of the light which has passed through shifts with respect to the peak wavelength at the time when an electric field is applied. The refractive index nh of the torsional nematic liquid crystal layer with respect to natural light when no electric field is applied is as if it were an intermediate value of the two principal indices of refraction ne, no. On the other hand, as illustrated in FIG. 6B, when an electric field is applied to the torsional nematic liquid crystal 501, the liquid crystal molecules 508 are arranged in the direction in which the electric field is applied. In this state, the incident natural light interferes on the basis of the optical path length, which is determined by the thickness and the refractive index of the actual liquid crystal layer. Here, the refractive index nv of the torsional nematic liquid crystal layer with respect to natural light when an electric field is applied is as if it were equal to the principal index of refraction no.

The import of the above description is that the refractive index anisotropy of the liquid crystal is controlled so that the average refractive index anisotropy is about 0.

The refractive index nv of the torsional nematic liquid crystal 501 when an electric field is applied is expressed by the principal index of refraction no. The refractive index nh when no electric field is applied (nv<nh) depends on the torsional angle of the liquid crystal molecules 503. The switching characteristic can be obtained by the refractive index nh being changed to the refractive index nv (nv<nh) by the application of the electric field.

As described above, the refractive index nh of the torsional nematic liquid crystal 501 when no electric field is applied depends on the torsional angle of the liquid crystal molecules 503. As a result, the switching characteristic is also dependent on the torsional angle.

Figure 8A:
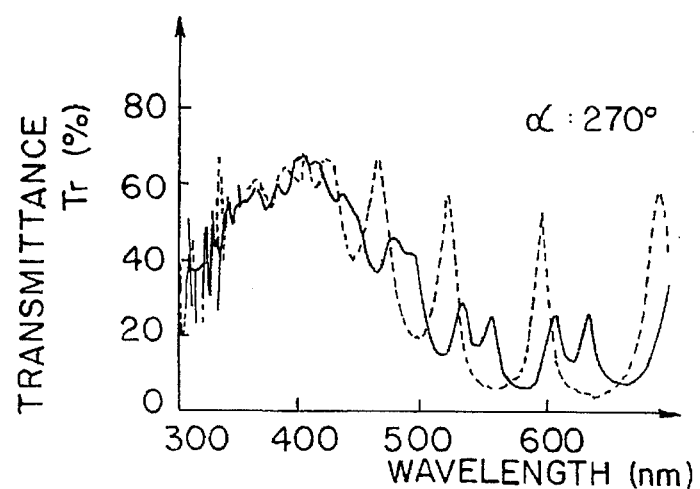
FIG. 8A is a characteristic view illustrating transmittance in a case in which a torsional angle of the optical switching element illustrated in FIG. 6A
Figure 8B:
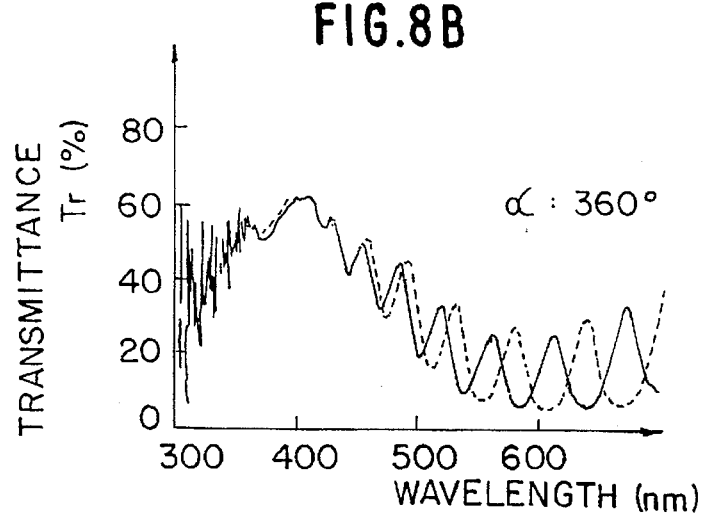
FIG. 8B is a characteristic view illustrating transmittance in a case in which a torsional angle of the optical switching element illustrated in FIG. 6A
Figure 8C:
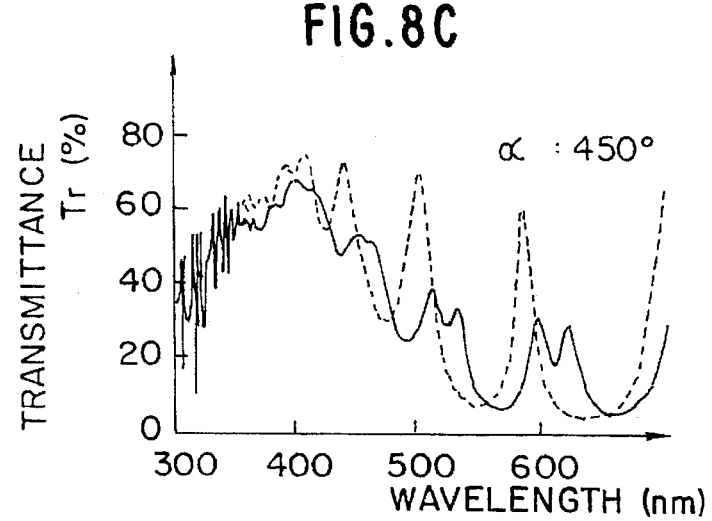
FIG. 8C is a characteristic view illustrating transmittance in a case in which a torsional angle of the optical switching element illustrated in FIG. 6A

The relationship between the torsional angles of the liquid crystal molecules and the switching characteristics will be described hereinafter with reference to FIGS. 7A through 7D and FIGS. 8A through 8C. FIGS. 7A through 7D illustrate transmittance characteristics when the torsional angles α of the liquid crystal molecules are set to 0 degrees, 45 degrees, 90 degrees and 180 degrees, respectively. FIGS. 8A through 8C illustrate transmittance characteristics when the torsional angles α of the liquid crystal molecules are set to 270 degrees, 360 degrees and 450 degrees, respectively. The vertical axis and the horizontal axis represent transmittance and wavelength, respectively.

The solid lines and the dotted lines in FIGS. 7A through 7D and FIGS. 8A through 8C illustrate transmittance characteristics when no electric field is applied and when an electric field is applied, respectively. Along with the application of the electric field, the peak wavelength moves toward the low wavelength side.

It is to be noted that a large contrast ratio can be obtained in a specific wavelength by torsionally orienting the liquid crystal molecules. Further, when the torsional angle α is set to 180 degrees and 360 degrees, the transmittance characteristic moves in a state in which the waveform at the time when no electric field is applied is maintained. Therefore, it can be understood that when the torsional angle α is set to 180 degrees×n (wherein n is a positive integer), a good switching characteristic is obtained. Further, the tolerance of the torsional angle α which is set to 180 degrees×n is preferably less than or equal to ±30%, and more preferably less than or equal to ±10%.

The transmittance characteristic is measured under the following conditions.
Spectral meter:
IMUC7000 (manufactured by Ohtsuka Electronics, Ltd.).
Light source:
Xenon lamp.
Electric field:
Apply a rectangular wave of 1 kHz and an amplitude of 20 V by using a waveform generator NF1930 (manufactured by NF Circuit Block, Ltd.) and an amplifier NF4005 (manufactured by NF Circuit Block, Ltd.).

In the nematic liquid crystal, liquid crystal in which hybrid molecules are arranged may be torsionally oriented.

Figure 9A:
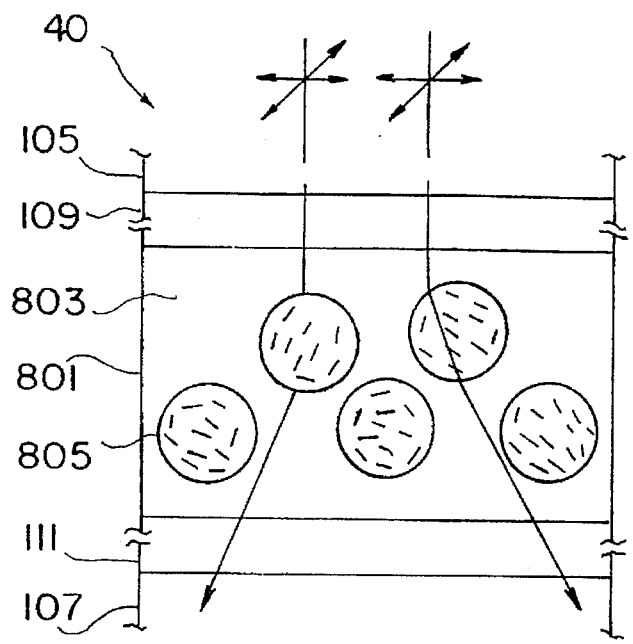
FIG. 9A is a schematic structural view of an optical switching element using a polymer-dispersed-type liquid crystal when no electric field is applied.
Figure 9B:
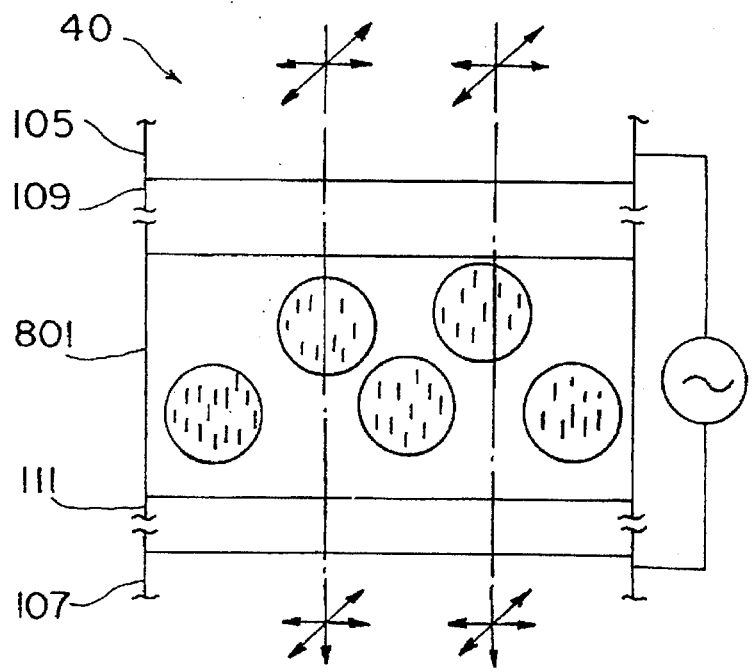
FIG. 9B is a schematic structural view of an optical switching element using a polymer-dispersed-type liquid crystal when an electric field is applied.

FIGS. 9A and 9B illustrate an optical switching element 40 using a polymer-dispersed-type liquid crystal. As illustrated in FIG. 9A, a polymer-dispersed-type liquid crystal 801 having a light scattering effect is interposed between layered bodies of the electrodes 105,107 and the interference layers 109, 111. In the polymer-dispersed-type liquid crystal 801, granular nematic liquid crystals 805 are scattered in a polymer 803.

With the exception of the liquid crystal layer, the optical switching element 40 is formed under the same conditions as the torsional nematic liquid crystal illustrated in FIG. 6A and FIG. 6B. The polymer-dispersed-type liquid crystal layer is hardened by ultraviolet ray illumination (for one minute) after liquid crystal E8 (manufactured by Melk Co.) and ultraviolet ray hardened resin, in a ratio of 2:1, are injected and dispersed into the cell.

When no electric field is applied to the polymer-dispersed-type liquid crystal 801 forming the optical switching element 40, the molecules of the nematic liquid crystal 805 are oriented in respectively different directions. In this state, the difference between the refractive indices of the nematic liquid crystal. 805 and the polymer 803 is large. Incident natural light is affected by scattering or by reflection, and the transmittance of the incident light is thereby reduced. On the other hand, light which is not affected by scattering is affected by the polymer-dispersed-type liquid crystal layer having the refractive index nh.

Further, as illustrated in FIG. 9B, when an electric field is applied to the polymer-dispersed-type liquid crystal 801, the molecules Of the nematic liquid crystal 805 are arranged along the direction in which the electric field is applied. In this state, because the difference between the refractive indices of the nematic liquid crystal 805 and the polymer 803 becomes small, the incident natural light passes through without being affected by the interface of the nematic liquid crystal 805.

A nematic liquid crystal, which is representative of a uniaxial crystal, has two different principal indices of refraction no, ne. The refractive index nh of the polymer-dispersed-type liquid crystal 801 when no electric field is applied is expressed by (2no+ne)/3, and the refractive index nv when an electric field is applied is expressed by no.

When the refractive index nh changes to the refractive index nv (nv<nh) due to the application of an electric field, the incident light is affected by the interference effect of the element and by the scattering effect of the liquid crystal layer. Accordingly, because the transmittance of the incident light changes, a switching characteristic is obtained.

If the layer of the polymer-dispersed-type liquid crystal 801 is a hardened polymer, a thin film can be formed by a uniform film forming means such as spincoating or the like. Accordingly, as compared with a case in which liquid crystal is injected into gaps, the layer can be formed easily.

There exist various hardened types of polymers such as an ultraviolet ray hardened type, in which ultraviolet rays are illuminated to an applied polymer so as to harden the polymer; a solvent dried type, in which an applied polymer is dried and hardened by heat or by a solvent drying means such as air or the like; a thermosoftened type, in which an applied polymer which is in a high temperature state is cooled; and a thermoset type in which heat is applied to an applied polymer so as to harden the polymer. With such polymers, a thin film of a uniform layer thickness can be formed easily.

Figure 10:
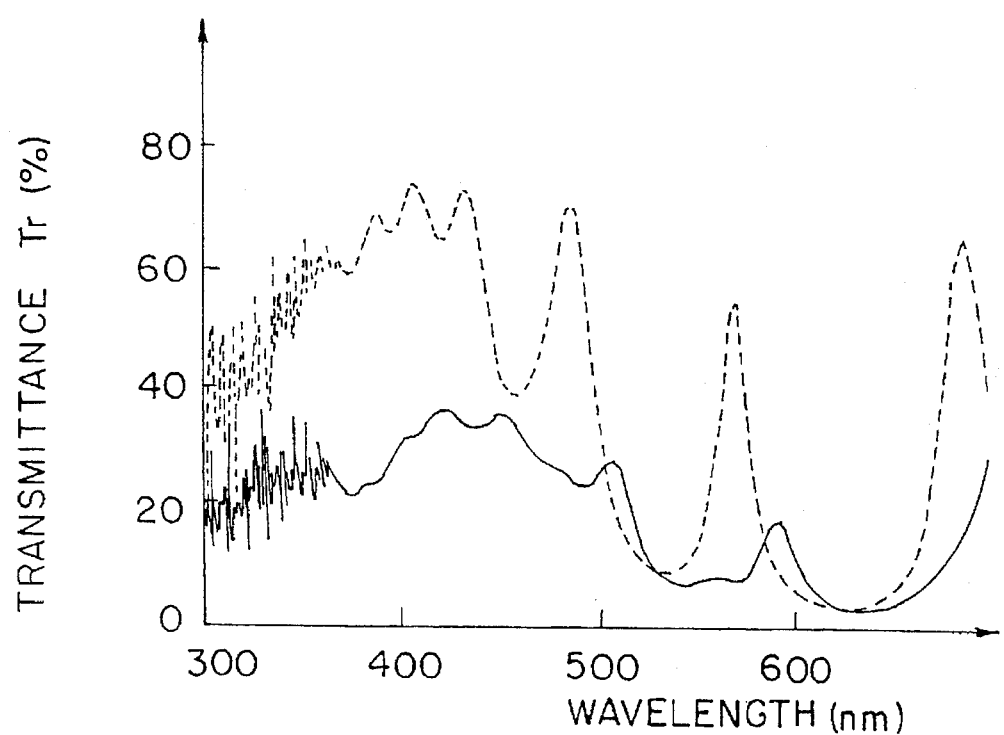
FIG. 10 is a characteristic view illustrating transmittance of the optical switching element illustrated in FIG. 9A and FIG. 9B.

FIG. 10 illustrates transmittance characteristics of an optical switching element using a polymer-dispersed-type liquid crystal. In FIG. 10, the vertical axis and the horizontal axis represent transmittance and wavelength, respectively. The solid line and the dotted line represent the transmittance characteristics when no electric field is applied and when an electric field is applied, respectively. With the optical switching element having the above-mentioned characteristics, a good switching characteristic can be obtained in the vicinity of a wavelength of 570 nm. The wavelength obviously depends on the optical conditions such as layer thickness and the like.

As a modulating means exhibiting a light scattering effect, a liquid crystal compounded body or a dynamic-scattering-type liquid crystal may be used in which a ferroelectric liquid crystal and a polymer may be compounded so that the ferroelectric liquid crystal is dispersed within the polymer and the liquid crystal molecules are randomly oriented.

In the variable optical path length layer, instead of the above-described liquid crystal, a ferroelectric inorganic material such as a polyvinylidene fluoride polymer or copolymer, PZT, PLZT, BTO, STO, BST or the like, or an electric field induced ferroelectric material may be used. These materials exhibit an electrooptic effect. The electric field induced ferroelectric material is a material which changes from a phase other than a ferroelectric phase, such as an anti-ferroelectric phase, to a ferroelectric phase due to the application of an electric field. The electric field induced ferroelectric material has a distinguishing feature in that the variation in the optical path length is large.

Further, the variable optical path length layer may be a layer whose optical path length is changed by application of a magnetic field or a sound field rather than an electric field. A variable optical path length layer, which is formed in a liquid crystal phase, a liquid phase or an air phase, may be interposed between the pair of substrates. A variable optical path length layer, which is formed of a solid phase, can be supported at one of the substrates.

The optical switching elements 10, 20, 30, 40 described above can be used in various types of liquid crystal display devices. For example, by using the optical switching elements 10, 20, 30, 40 as a light valve of a projection-type display device, an image can be projected while light is used efficiently.

Further, by using the optical switching elements 10, 20, 30, 40 as a light shutter in a reverse surface illumination type display device or in a front surface illumination type display device, the incident light can be controlled at a high contrast ratio.

It is preferable that the transmittance characteristic of the optical switching element has a peak characteristic in a frequency band corresponding to wavelengths of B, G, R and that the emission spectrum of the reverse surface light source has a peak characteristic in a narrow frequency band. In this way, a highly detailed image can be displayed.

Figure 11:
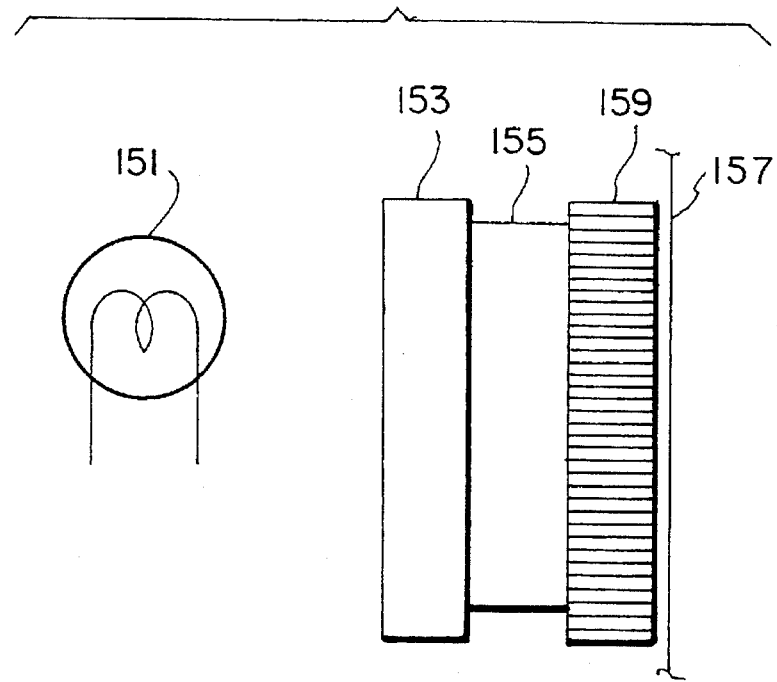
FIG. 11 is a schematic structural view illustrating portions of a light printer using an optical switching element.

As illustrated in FIG. 11, the above-described optical switching element can be used as the light shutter of a light printer. The light printer controls light illuminated from a light source 151 by an optical switching element 155, superposed with a glass substrate 153, and writes an image on a photosensitive body 157.

In general, when a brightness pattern of a light shutter is formed on a surface of a photosensitive material, the brightness pattern is formed via a lens system such as a SELFOC lens or the like. The reason for this is that the light shutter cannot be fit to the surface of the photosensitive material due to the polarizing plates which are disposed on the side of the light shutter from which light exits. In this case, the resolution of an image formed on the surface of the photosensitive material depends on the accuracy of the lens system.

Because the supporting substrate is provided at the side of the optical switching element 155 from which light exits, the supporting substrate is replaced by a fiber array 159, and the high resolution image obtained at the optical switching element 155 is wave-guided to the photosensitive body 157 via the fiber array 159. Accordingly, a highly detailed image can be formed on the surface of the photosensitive material.

Here as well, it is preferable that the emission spectrum of the light source 151 has a peak characteristic of a narrow frequency band. It is preferable that the light source 151 is a high-pressure mercury lamp which generates light of a wavelength longer than 350 nm, or a fluorescent lamp or the like. The reason for this is that the transmittance of the glass substrate 153 is small with respect to light of wavelengths shorter than 350 nm.

Hereinafter, the electrode structure of the above-described optical switching elements applied to a display device will be described with reference to FIG. 12. Members which are the same as those illustrated in FIG. 1 are denoted by the same reference numerals, and description thereof is omitted. The interference layers 109, 111 are omitted from FIG. 12.

Figure 12:
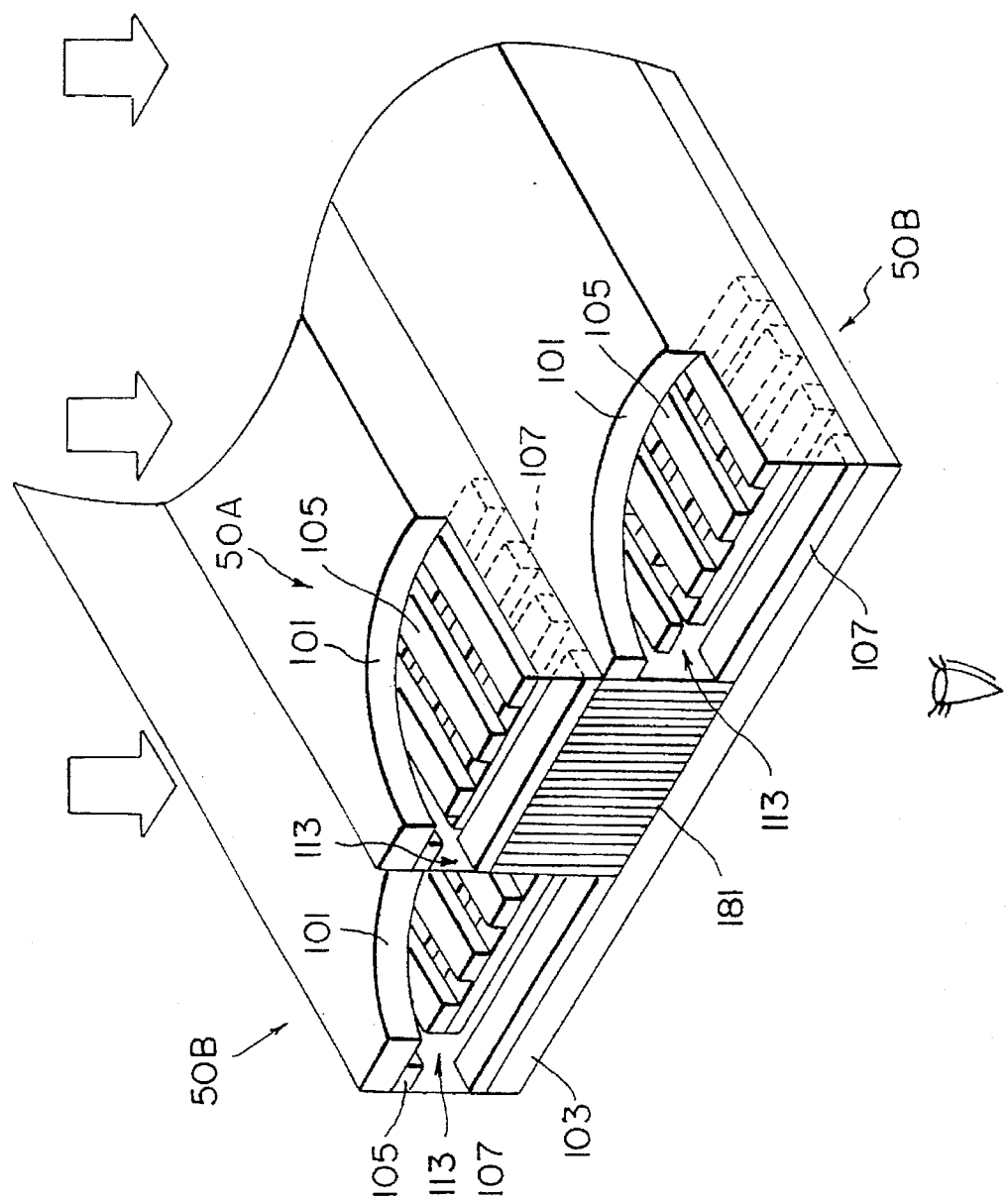
FIG. 12 is a partial perspective view illustrating an electrode structure of a display device using an optical switching element.

The matrix arrangement electrode structure illustrated in FIG. 12 is divided into three, and optical switching elements 50A, 50B are disposed in a stepped configuration. At the central optical switching element 50A, a fiber array 181 is disposed between electrodes 107 (signal electrodes) and the glass substrate 103. The fiber array guides image light to a display surface (i.e., the glass substrate 103).

Electrodes 105 (scan electrodes), which are divided into three, of the respective optical switching elements 50A, 50B are all jointly connected so that the three scan electrodes are driven simultaneously. On the other hand, signal wires are lead out respectively from each electrode 107 (signal electrode) of the optical switching elements 50A, 50B. Because the optical switching elements are stepped with respect to the adjacent optical switching element, the signal wires can be lead out from the signal electrodes of the respective optical switching elements 50A, 50B without interference.

The optical switching element 50A positioned in the center is built-up three-dimensionally with respect to the optical switching elements 50B at the sides thereof. When the display surfaces of the respective optical switching elements are arranged in a stepped configuration in accordance with the three-dimensional structure, parallax arises in the displayed image. Accordingly, due to the fiber array 181 between the electrodes 107 of the central optical switching element 50A and the glass substrate 103, the display surfaces of the respective optical switching elements are disposed in the same plane. Accordingly, an image having no parallax is displayed on the entire display surface.

The above embodiment describes a case in which the scan electrodes are divided into three. However, the number of divisions may be increased in accordance with the resolution of the display image or in accordance with the response characteristic of the liquid crystal 113.

An imaging optical system such as a SELFOC lens may be used instead of the fiber array 181. Even in a case in which the scan electrode is divided in two, because the respective optical switching elements can be arranged in a stepped configuration, the lead-out directions of the signal wires can be made uniform.

Methods of driving the optical switching elements will now be described. The commonly-known light address driving method, thin film transistor driving method or simple matrix driving method can be used as the driving method.

Figure 13:
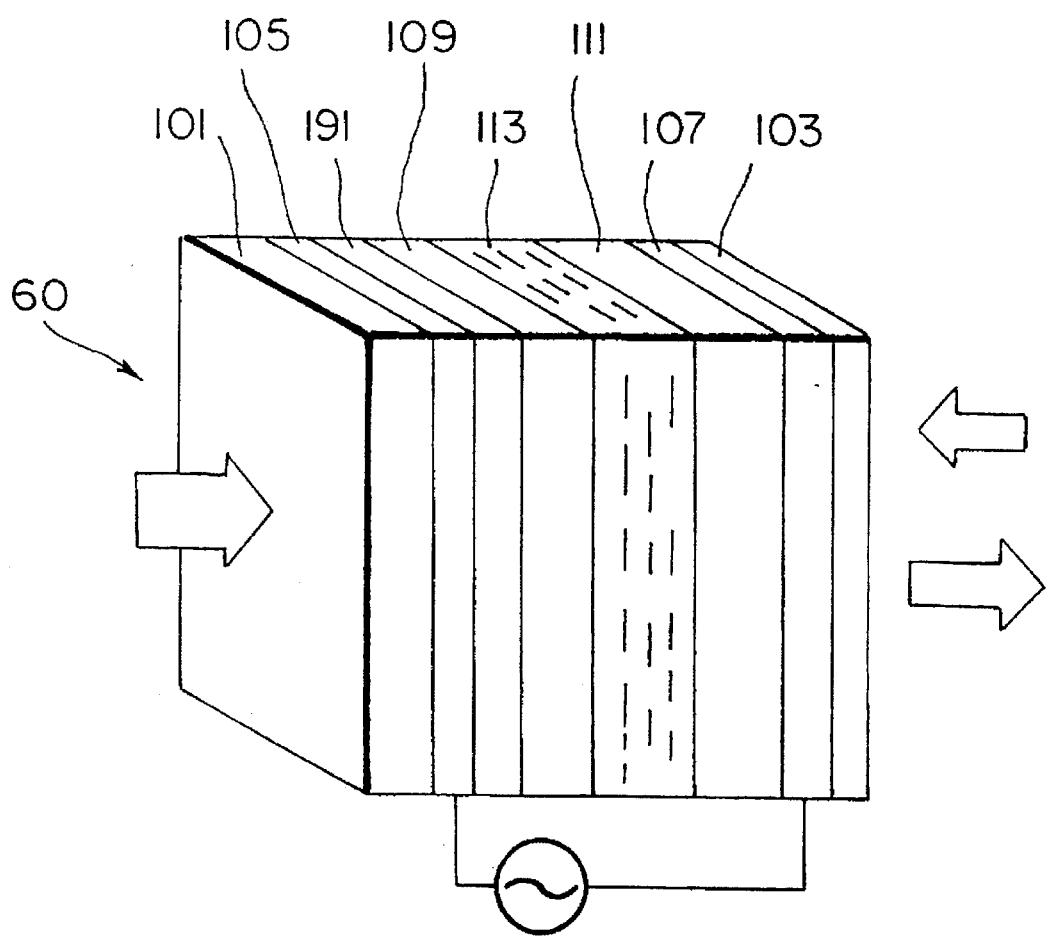
FIG. 13 is a schematic sectional view of an optical switching element using a light address driving method.

The light address driving method uses a layer structure of a space light modulating element. Namely, as illustrated in FIG. 13, in an optical switching element 60, a photoconductive layer 191, the interference layer 109, the liquid crystal layer 113 and the interference layer 111 are disposed between the pair of glass substrates 101, 103 which are provided with the transparent electrodes 105, 107, respectively.

When writing light which is incident from the glass substrate 101 side is illuminated to the photoconductive layer 191, the impedance of the photoconductive layer 191 at the illuminated portions decreases. An electric field is applied to the liquid crystal layer 113 corresponding to the portions of lowered impedance, and the liquid crystal molecules are arranged in the direction in which the voltage is applied. Pattern regions of different reflectivities are formed in the liquid crystal layer 113 depending on the arrangement of the liquid crystal molecules. On the other hand, reading light incident from the glass substrate 103 side is reflected and lead out at the pattern regions of the liquid crystal layer 113 formed as described above. By controlling the reflecting and leading out of the reading light, a switching effect is obtained.

In the thin film transistor driving method, thin film transistors which are arranged in a matrix are successively scanned so that a switching effect of each element is obtained.

In the simple matrix method, a plurality of electrodes are scanned in time divisions so that a switching effect of each element is obtained.

Further, by dual frequency drive of liquid crystals whose dielectric anisotropy is dependent on frequency, a high speed switching characteristic can be obtained.

What is claimed is:

1. An optical switching element comprising:

a plurality of switching elements divided into plural groups of switching elements, each group having a matrix arrangement electrode structure in which signal electrodes and scan electrodes are driven simultaneously, wherein each pair of groups of switching elements is arranged in a stepped configuration such that one of each pair is raised along the optical path direction; and a parallax eliminating member provided under the electrode structure of each raised group of switching elements and between the electrode structures of the groups of switching elements adjacent the raised group.

2. An optical switching element according to claim 1, wherein said parallax eliminating member is a fiber bundle body.

3. An optical switching element according to claim 1, wherein said parallax eliminating member is a SELFOC lens array.

* * * * *